Patented Oct. 20, 1931

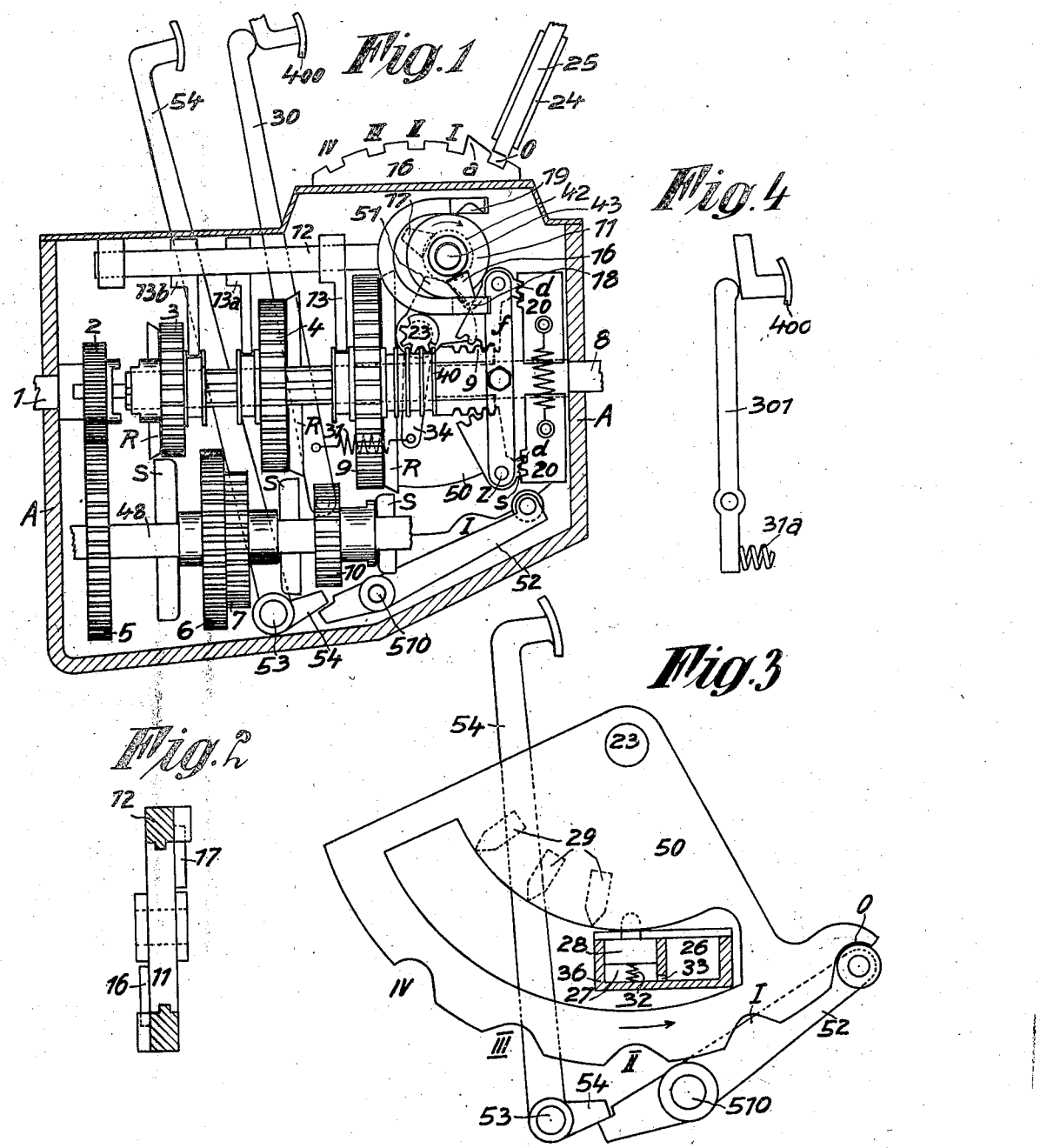

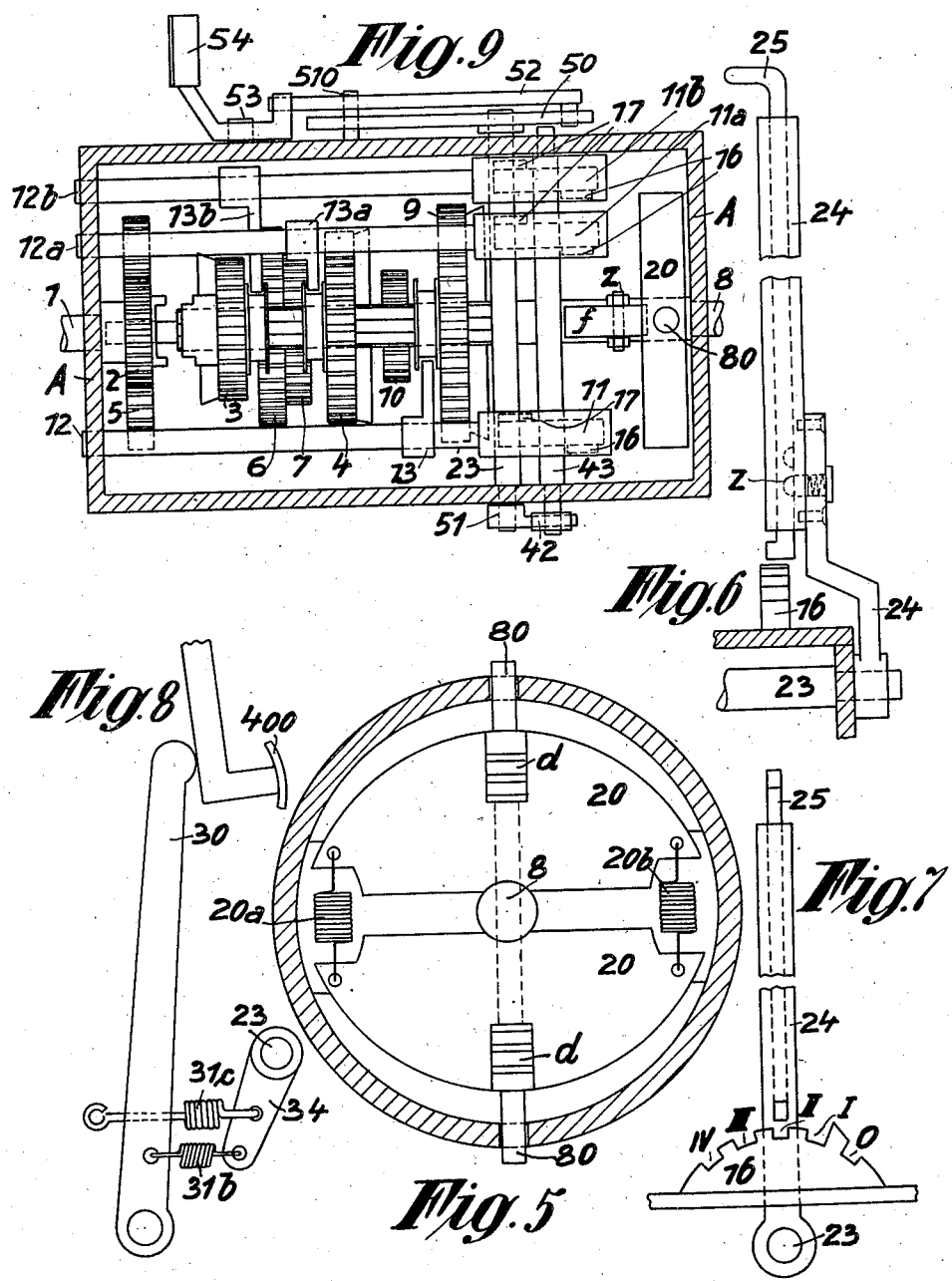

1,828,606

UNITED STATES PATENT OFFICE

EDUARD JANIK, OF VIENNA, AUSTRIA

AUTOMATIC VARIABLE SPEED GEAR

Application filed December 22, 1930, Serial No. 504,124, and in Austria December 31, 1929.

The object of the invention is to provide a variable speed gear permitting the adjustment of the speed in accordance with the load automatically without any action on the part of the driver and even without his knowledge. The particular advantage of the invention lies in that the direct drive at all numbers of revolution and at normal load is had so that only on starting and on running up hill or inclinations which the motor cannot take with direct drive, the variable speed gear will adjust itself to the leverage which is the most favorable at any time.

The invention is illustrated in Fig. 1 in side elevation and Fig. 9 is a plan view of the variable speed gear the casing being shown in section.

Figs. 2, 3 and 4 and 5, 6, 7 and 8 show details.

The variable speed gear is driven by the gear wheel 2 fast on the driving shaft 1 and carrying clutch elements and permanently engaging the gear wheel 5 fast on the transmission shaft 48. As shown in Figs. 1 and 9 the gear wheels 5, 6, 7, 10 are fast on the shaft 48. On the driven shaft 8 are mounted the axially movable gear wheels 4, 9 and the gear wheel 3 carrying a clutch element.

The first speed involves the wheels 2, 5, 10, 9; the second speed involves the wheels 2, 5, 7, 4; the third speed involves the wheels 2, 5, 6, 3; and for the fourth speed (direct drive) the shafts 2 and 8 are coupled by means of the wheels 2 and 3.

The automatic varying of the speed is brought about by a centrifugal governor of any preferred construction. In the example shown its revolving masses 20 guided along rods 80 carry short racks $d$ engaging into toothed segments $s$ rotatably mounted on journal pins $z$ mounted in carriers $f$ secured to the shaft 8. The toothed segments $s$ engage into a non rotary but axially movable sleeve 40 which, as the revolving masses 20 of the governor recede from each other, is moved to the right. The shaft 23 journalled in the casing A of the gear carries a toothed segment 51 engaging into a toothed wheel 42 fast on the shaft 43.

Fast on the shaft 43, Figs. 1 and 2, are discs 11 each of which moves longitudinally forked rods 12, 12$^a$, 12$^b$ respectively in the following manner:

Each of the three discs 11, 11$^a$, 11$^b$ on one side Fig. 9 carries a tooth 16 or two teeth arranged the one in rear of the other and on the opposite side a tooth 17 or two teeth arranged the one in rear of the other. When the teeth 16 engage into recesses 18 of the forks 18, 12, 12$^a$, 12$^b$ they push the forks to the left and when the teeth 17 engage into the recesses 19 of the forks they push the forks to the right. The teeth 16, 17 on the discs 11, 11$^a$, 11$^b$ and the recesses 18 and 19 of the forks are so arranged that on turning the shaft 43 with the discs 11, 11$^a$, 11$^b$ in the direction of the arrow the forks cut in the increasing speeds in succession by means of the pushers 13, 13$^a$, 13$^b$, that is to say the disc 11 together with the fork 12 and the pusher 13 bring the toothed wheel 9 into and out of engagement with the toothed wheel 10. The disc 11$^a$ together with the fork 12$^a$ and pusher 13$^a$ act in the same way in respect of the toothed wheels 4 and 7 and the disc 11$^b$ together with the fork 12$^b$ and the pusher 13$^b$ act in the same way in respect of the toothed wheels 3 and 6 and moreover throw into and out of operation the clutch between the wheels 3 and 2.

Obviously, when the shaft 43 revolves in the opposite direction, the diminishing speeds are cut in in succession by the same parts.

The shaft 23 carries a hand lever 24 provided with a sliding bolt 25 which in the automatic varying of the speed moves along with the shaft 23. The recesses for the four speeds in the arc 16 serve for the non-automatic adjustment for a predetermined speed for instance the first or the second when going down hill at a reduced speed.

The stop $a$ between the notches for the first speed and the notch $o$ for idle running in the locking segment is higher than the other steps and prevents the lever 24 from automatically adjusting itself to idle running which movement would be possible and would result in the drawback that the lever 24 would have to be adjusted by hand to the first speed whenever the automobile has to be started so that the automatic operation would be interrupted at the numerous stops in the traffic in large cities.

For this purpose the hand lever 24 (see Figs. 6 and 7) carries a spring actuated stop pin z which holds the sliding bolt 25 in its unlocked or locked position. As shown in Figs. 6 and 7 the locking bolt is in its unlocked position.

Outside the gear casing is mounted on the shaft 23 the segment 50, Figs. 1 and 3, with the notches for the I, II, III and IV speed and with the notch O for idle running. The segment 50 uncouples the coupling lever 54 by means of the coupling lever 52 rocking around the journal pin 53 whenever speeds are changed.

Since when moving in the direction of the arrow it forces the right hand arm of the lever 52 out of the notch O and depresses the same. Therefore the left hand arm of the lever 52 raises the short arm of the coupling pedal lever 54 and thus brings about uncoupling.

On the outer wall of the gear casing a receptacle 36 with the chambers 26, 27 is provided. The chamber 27 contains a piston 28 which is depressed at the beginning of each speed change by the projections 29 on the segment against the action of the spring 32 whereby the liquid is forced through a nozzle 33 into the chamber 26. By this arrangement a short slowing down of the axial movement of the gear wheels 3, 4 or 9 is brought about during which slowing down the elastic friction discs R, S prepare an equal revolving speed of those two gear wheels which have to be brought into engagement with each other, thereby securing a smooth and noiseless pushing of the one gear wheel into engagement with the other.

In the hand operated variable speed gears heretofore in use as a rule the direct drive is used at any number of revolutions with normal loads so that the gear is put into operation only on starting and on marked inclines. The advantage of the direct drive is to be found in the full or 100% efficiency in the noiseless running and the fact that the gear wheels are protected from undue wear.

According to the present invention the same advantage is secured with the automatic operation of the variable speed gear in the following manner:

The revolving masses and the springs of the centrifugal governor are so chosen that the direct drive with normal loads is the rule even with the poorest charges and hence lowest numbers of revolution, in which case the revolving masses of the governor are widest apart.

As the load increases without increasing the fuel contents of the cylinder charges of the motor, the speed of the driving shaft is reduced and hence also that of the driven shaft so that the 3rd, 2nd and 1st speed are automatically cut in in succession. In order to secure a similar result also in case that the fuel contents of the cylinder charges are varied, that is to say in order to secure an automatic variation of speeds even with varying fuel contents of the cylinder charges a force counteracting the centrifugal force of the revolving masses of the governor and increasing as the fuel contents of the cylinder charges increase, is thrown into operation. For this purpose the gas lever 400 controlling the fuel contents of the cylinder charges engages with a lever 30 (Fig. 1) connected to a part operated by the revolving masses of the governor for instance an arm 34 on the shaft 23 by a spring 31. As the gas lever 400 is depressed for increasing the fuel contents of the cylinder charges in the usual manner, the tension put on the spring 31 also increases and this spring being attached to the arm 34 of the shaft 23 counteracts the centrifugal force of the revolving masses of the governor through the medium of the gearing interposed between the said shaft 23 and the revolving masses as above described.

As the gas lever 400 is progressively actuated for increasing the fuel contents of the cylinder charges the tension of the spring 31 counteracting the centrifugal force of the revolving masses of the governor is progressively increased. This spring 31 is so proportioned that each position of the lever 400 the direct drive is maintained with the normal variations of load. But whenever with a given position of the gas levers the load increases abnormally, for instance on running uphill along an incline which, with the given position of the gas lever, the motor cannot take in direct drive, the third, second and first speed will be cut in automatically in succession as above explained. Thus for instance when the maximum speed of the motor is 2400 revolutions per minute and the motor cannot take the incline with this maximum speed at the given position of the gas lever, then the motor will slow down and also the driven shaft 8 and the governor. Thereby the revolving masses of the latter which also are then under the action of the spring 31, will approach each other and the third speed will be cut in automatically as above explained. The motor may then speed up again to 2400 revolutions per minute since the load upon the same is reduced, but the driven shaft will remain at the third speed and so on.

It is obvious that on stopping the car and for the next following starting the first speed will be always thrown into operation automatically, the increased load being produced artificially by the application of the brakes.

If instead of a pulling spring 31 a pushing spring 31ᵃ Fig. 4, has to be used, the gas lever 400 acts on a two armed lever 301, this spring 31ᵃ acting against some part moving together with the shaft 23 in opposition to the centrifugal force of the governor.

Since on progressive depression of the gas lever 400 the number of revolutions of the motor increases, but the centrifugal force of the revolving masses of the governor is proportional to the square of the number of revolutions of the governor, it is preferable to use a plurality of springs 31 or 31ᵃ coming in operation successively.

Fig. 8 illustrates the use of two springs 31ᵇ, 31ᶜ. The bottom spring 31ᵇ acts immediately whenever the gas lever 400 is operated, whereas the left end of the top spring 31ᶜ passes through a bore of the lever 30 and is bent at a certain distance from this lever so that it is thrown into operation only when the gas lever 400 has been already depressed to a certain extent.

For idle running first the lever 54 and the brake pedal are depressed whereby the shafts 1, 8 and 48 are stopped and then the lock bolt 25 is forced upwards, the lever 24 is brought into the position for idle running and then the locking bolt is forced downwards.

For the frequent short stops in the traffic of a large city it is sufficient to depress the clutch lever and the pedal brake whereupon on stopping the first speed is cut in; for restarting it is sufficient to release both levers whereupon the 2nd, 3rd and fourth speeds are cut in in succession.

The reverse or backward running is brought about in a manner similar to that used in the variable speed gears with toothed wheels as now in use.

The operation of the present variable speed gear is as follows:

For starting the variable speed gear the shaft 23 is so adjusted by the hand lever 24 that the small roller of the lever 52 engages into the notch I which position corresponds to the first speed, the wheel 9 engaging into the wheel 10. Then all speed changes take place exclusively automatically until the motor is stopped. But when the centrifugal force of the governor has reached the value which would bring about the throwing into operation of the second speed the motor shaft is uncoupled by means of the lever 52 and then the pusher 12ᵃ together with the wheel 9 are shifted to the right by means of the tooth 17 into the position shown. Then by means of the tooth 16 the rod 12ᵃ together with the toothed wheel 4 are moved to the left. This movement is at the beginning retarded by the cooperation of the stop 29, Fig. 3, and the piston 28 in order that the discs R S may have time to bring their toothed wheels 4, 7 to approximately equal speed whereupon the wheel 4 is pushed into engagement with the wheel 7. Thereby the little roller of the lever 52 is caused to engage the notch II of the segment 50 for the second speed. Similarly the third and the fourth speed are cut in as above described.

When owing to a higher load on the shaft 8 the sleeve 40 is moved to the left by the revolving masses of the governor the shaft 43 rotates together with the discs 11, 11ᵃ, 11ᵇ in the direction opposite to that indicated by the arrow and then the lower speeds are cut in in succession.

What I claim is:

1. In combination with a variable speed gear comprising a driving shaft, a driven shaft, a clutch and a transmission shaft intermediate the first named two shafts, a gear wheel on the driving shaft and a gear wheel on the intermediate shaft engaging into the said gear wheel on the driving shaft, gear wheels slidably mounted on the driven shaft, gear wheels mounted on the intermediate shaft, a centrifugal governor mounted on the driven shaft and means operatively connected to the said governor for displacing the gear wheels on the driven shaft whereby any one of these last named gear wheels may be brought into and out of engagement with the associated gear wheel on the intermediate shaft; a gas lever and means comprising at least one spring operatively connecting the said gas lever and the said centrifugal governor and means for increasing the tension put on the said spring progressively as the gas lever is moved progressively in one direction whereby the resistance to the centrifugal force of the said centrifugal governor is progressively increased.

2. In combination with a variable speed gear comprising a driving shaft, a driven shaft, a clutch and a transmission shaft, intermediate the first named two shafts, a gear wheel on the driving shaft and a gear wheel on the intermediate shaft engaging into the said gear wheel on the driving shaft, gear wheels slidably mounted on the driven shaft, gear wheels mounted on the intermediate shaft, a centrifugal governor mounted on the driven shaft and means operatively connected to the said governor for displacing the gear wheels on the driven shaft whereby any one of these last named gear wheels may be brought into and out of engagement with the associated gear wheel on the intermediate shaft, a gas lever and means comprising a plurality of springs operatively connected to the said gas lever and to the said centrifugal governor, means for throwing into operation the said springs in succession and means for increasing the tension put on each of the said springs progressively as the gas lever is moved progressively in one direction whereby the resistance to the centrifugal force of the said centrifugal governor is progressively increased.

3. A variable speed gear comprising a driving shaft, a driven shaft, a clutch and a transmission shaft intermediate to the first named two shafts, a gear wheel on the driving shaft and a gear wheel on the intermediate shaft engaging into the said gear wheel on the driving shaft, gear wheels slidably mounted on the driven shaft, gear wheels mounted on the intermediate shaft, a centrifugal governor mounted on the driven shaft and means operatively connected to the said governor by displacing the gear wheels on the driven shaft whereby any one of these last named gear wheels may be brought into and out of engagement with the associated gear wheel on the intermediate shaft, a first transverse shaft, means for operatively connecting the said centrifugal governor with the said first transverse shaft, a notched segment and a hand lever mounted on the said first transverse shaft, a second transverse shaft and means for operatively connecting the two said transverse shafts.

4. A variable speed gear comprising a driving shaft, a driven shaft, a clutch and a transmission shaft intermediate the first named two shafts, a gear wheel on the driving shaft and a gear wheel on the intermediate shaft engaging into the said gear wheel on the driving shaft, gear wheels slidably mounted on the driven shaft, gear wheels mounted on the intermediate shaft, a centrifugal governor mounted on the driven shaft and means operatively connected to the said governor for displacing the gear wheels on the driven shaft whereby any one of these last named gear wheels may be brought into and out of engagement with the associated gear wheel on the intermediate shaft, a first transverse shaft, means for operatively connecting the said centrifugal governor with the said first transverse shaft, a notched segment and a hand lever mounted on the said first transverse shaft, and means for operatively connecting the said notched segment to the said clutch whereby the said clutch is thrown out of operation whenever the said notched segment is moved.

5. A variable speed gear comprising a driving shaft, a driven shaft, a clutch and a transmission shaft intermediate the first named two shafts, a gear wheel on the driving shaft and a gear wheel on the intermediate shaft engaging into the said gear wheel on the driving shaft, gear wheels slidably mounted on the driven shaft, gear wheels mounted on the intermediate shaft, a centrifugal governor mounted on the driven shaft and means operatively connected to the said governor for displacing the gear wheels on the driven shaft whereby any one of these last named gear wheels may be brought into and out of engagement with the associated gear wheel on the intermediate shaft, a first transverse shaft, means for operatively connecting the said centrifugal governor with the said first transverse shaft, a notched segment and a hand lever mounted on the said first transverse shaft and means for operatively connecting the said notched segment to the said clutch the last named means comprising a lever adapted to engage the notches of the said notched segment and means for operatively connecting the last named lever to the said clutch whereby the said clutch is thrown out of operation whenever the said notched segment is moved.

6. A variable speed gear comprising a driving shaft, a driven shaft, a clutch and a transmission shaft intermediate the first named two shafts, a gear wheel on the driving shaft and a gear wheel on the intermediate shaft engaging into the said gear wheel on the driving shaft, gear wheels slidably mounted on the driven shaft, gear wheels mounted on the intermediate shaft, a centrifugal governor mounted on the driven shaft and means operatively connected to the said governor for displacing the gear wheels on the driven shaft whereby any one of these last named gear wheels may be brought into and out of engagement with the associated gear wheel on the intermediate shaft, each of the said gear wheels on the said driven shaft and on the said intermediate shaft being provided with an elastic friction disc the friction discs of the associated gear wheels on the driven shaft and on the intermediate shaft being adapted to engage with each other.

7. A variable speed gear comprising a driving shaft, a driven shaft, a clutch and a transmission shaft intermediate the first named two shafts, a gear wheel on the driving shaft and a gear wheel on the intermediate shaft engaging into the said gear wheel on the driving shaft, gear wheels slidably mounted on the driven shaft, gear wheels mounted on the intermediate shaft, a centrifugal governor mounted on the driven shaft and means operatively connected to the said governor for displacing the gear wheels on the driven shaft whereby any one of these last named gear wheels may be brought into and out of engagement with the associated gear wheel on the intermediate shaft, and means for operatively connecting the said centrifugal governor with the said slidable gear wheels on the driven shaft, the last named means comprising a transverse shaft, a gearing interposed between the said transverse shaft and the said centrifugal governor discs, one for each gear wheel on the driven shaft, mounted on the said transverse shaft, pushers, one for each gear wheel on the driven shaft and engaging its gear wheel and movable along the driven shaft and means for operatively connecting each of the said pushers to one of the said discs associated to the said pushers.

8. A variable speed gear comprising a driving shaft, a driven shaft, a clutch and a transmission shaft intermediate the first named two shafts, a gear wheel on the driving shaft and a gear wheel on the intermediate shaft engaging into the said gear wheel on the driving shaft, gear wheels slidably mounted on the driven shaft, gear wheels mounted on the intermediate shaft, a centrifugal governor mounted on the driven shaft and means operatively connected to the said governor for displacing the gear wheels on the driven shaft whereby any one of these last named gear wheels may be brought into and out of engagement with the associated gear wheel on the intermediate shaft, and means for operatively connecting the said centrifugal governor with the said slidable gear wheels on the driven shaft, the last named means comprising a transverse shaft, a gearing interposed between the said transverse shaft and the said centrifugal governor discs, one for each gear wheel on the driven shaft, mounted on the said transverse shaft, pushers, one for each gear wheel on the driven shaft and engaging its gear wheel and movable along the driven shaft and means for operatively connecting each of the said pushers to one of the said discs associated to the said pushers, the last named means comprising teeth on opposite sides of the said discs, rods carrying the said pushers and also forks embracing the said discs and secured to the said forks, recesses in the said forks adapted to be engaged by the said teeth and means for guiding the said rods parallel to the driven shaft.

9. A variable speed gear comprising a driving shaft, a driven shaft, a clutch and a transmission shaft intermediate the first named two shafts, a gear wheel on the driving shaft and a gear wheel on the intermediate shaft engaging into the said gear wheel on the driving shaft, gear wheels slidably mounted on the driven shaft, gear wheels mounted on the intermediate shaft, a centrifugal governor mounted on the driven shaft and means operatively connected to the said governor for displacing the gear wheels on the driven shaft whereby any one of these last named gear wheels may be brought into and out of engagement with the associated gear wheel on the intermediate shaft, and means for operatively connecting the said centrifugal governor with the said slidable gear wheels on the driven shaft, the last named means comprising a sleeve adapted to slide on the driven shaft, but not revoluble thereon and provided with circumferential grooves, a gearing interposed between the said sleeve and the said centrifugal governor, a transverse shaft carrying pinion teeth engaging into the said circumferential grooves of the sleeve, a second transverse shaft, a gearing interposed between the two said transverse shafts, discs, one for each gear wheel on the said driven shaft, mounted on the said second transverse shaft, pushers, one for each gear wheel on the driven shaft and engaging its gear wheel and movable along the driven shaft and means for operatively connecting each of the said pushers to one of the said discs associated to the said pushers.

10. A variable speed gear comprising a driving shaft, a driven shaft, a clutch and a transmission shaft intermediate the first named two shafts, a gear wheel on the driving shaft and a gear wheel on the intermediate shaft engaging into the said gear wheel on the driving shaft, gear wheels slidably mounted on the driven shaft, gear wheels mounted on the intermediate shaft, a centrifugal governor mounted on the driven shaft and means operatively connected to the said governor for displacing the gear wheels on the driven shaft whereby any one of these last named gear wheels may be brought into and out of engagement with the associated gear wheel on the intermediate shaft, a first transverse shaft, means for operatively connecting the said centrifugal governor with the said first transverse shaft, a notched segment and a hand lever mounted on the said first transverse shaft, a second transverse shaft and means for operatively connecting the two said transverse shafts, lateral projections on the said notched segment, a stationary receptacle having two compartments one of which contains a liquid, a piston movable in the said liquid containing compartment, an abutment fast on the said piston and projecting beyond the said liquid containing compartment and adapted to engage with and be depressed by the said lateral projections, a partition separating the said two compartments from each other and a jet provided in the said partition.

11. A variable speed gear comprising a driving shaft, a driven shaft, a clutch and a transmission shaft intermediate the first named two shafts, a gear wheel on the driving shaft and a gear wheel on the intermediate shaft engaging into the said gear wheel on the driving shaft, gear wheels slidably mounted on the driven shaft, gear wheels mounted on the intermediate shaft, a centrifugal governor mounted on the driven shaft and means operatively connected to the shaft and means for displacing the gear wheels said governor for displacing the gear wheels on the driven shaft whereby any one of these on the driven shaft whereby any one of these last named gear wheels may be brought into last named gear wheels may be brought into and out of engagement with the associated gear wheel on the intermediate shaft, a first transverse shaft, means for operatively connecting the said centrifugal governor with the said first transverse shaft, a notched segment and a hand lever mounted on the said first transverse shaft, the notched segment adapted to be engaged by the said hand lever, a stop for the said hand lever provided between an extreme notch of the said notched segment and the adjacent notch, a second transverse shaft and means for operatively connecting the two said transverse shafts.

In testimony whereof I affix my signature to this specification.

EDUARD JANIK.